United States Patent

Kent et al.

[11] 4,101,197
[45] Jul. 18, 1978

[54] CONNECTORS FOR COAXIALLY COUPLING THE END OF A LINEAR OPTICAL WAVEGUIDE ELEMENT FOR A RECEIVING SURFACE

[75] Inventors: Alan Hugh Kent, Wokingham; Peter Howard Fell, Maidenhead, both of England

[73] Assignee: Plessey Handel und Investments AG, Zug, Switzerland

[21] Appl. No.: 692,782

[22] Filed: Jun. 4, 1976

[30] Foreign Application Priority Data

Jun. 6, 1975 [GB] United Kingdom ............... 24467/75

[51] Int. Cl.² .................................................. G02B 5/14
[52] U.S. Cl. ............................. 350/96.17; 250/227; 350/96.20
[58] Field of Search ............ 350/96 C, 96 WG; 250/227

[56] References Cited

U.S. PATENT DOCUMENTS

| 3,628,036 | 12/1971 | Humphrey | 350/96 C X |
| 3,923,371 | 12/1975 | Dalgleish | 350/96 C |
| 3,936,143 | 2/1976 | Sato | 350/96 C |
| 3,948,582 | 4/1976 | Martin | 350/96 C |
| 3,954,338 | 5/1976 | Hennel et al. | 350/96 C X |
| 3,976,355 | 8/1976 | Matthews | 350/96 C |

FOREIGN PATENT DOCUMENTS 2,425,798   1/1975   Fed. Rep. of Germany ..... 350/96 C

*Primary Examiner*—John K. Corbin
*Assistant Examiner*—John D. Lee
*Attorney, Agent, or Firm*—Fleit & Jacobson

[57] ABSTRACT

For coupling the end of an optical fibre or other linear optical waveguide element to a small-area receiving surface (e.g. surface of photodetector diode) in such manner as to ensure that the fibre makes contact with the surface at right angles to and substantially centrally to the surface, the receiving surface is centrally arranged at the end of a cylindrical boss, and the end of the fibre or like element is supported in a coupling member comprising a body having an end portion in which the end of the element is centered and of which at least the end portion which in the coupled position is nearest to the receiving surface is enclosed in a cylindrical holder tube which extends beyond the end of the end portion to form a collar adapted to encircle the boss and providing a cylindrical bore for sliding co-operation with the cylindrical outer surface of the boss.

4 Claims, 3 Drawing Figures

U.S. Patent
July 18, 1978
4,101,197
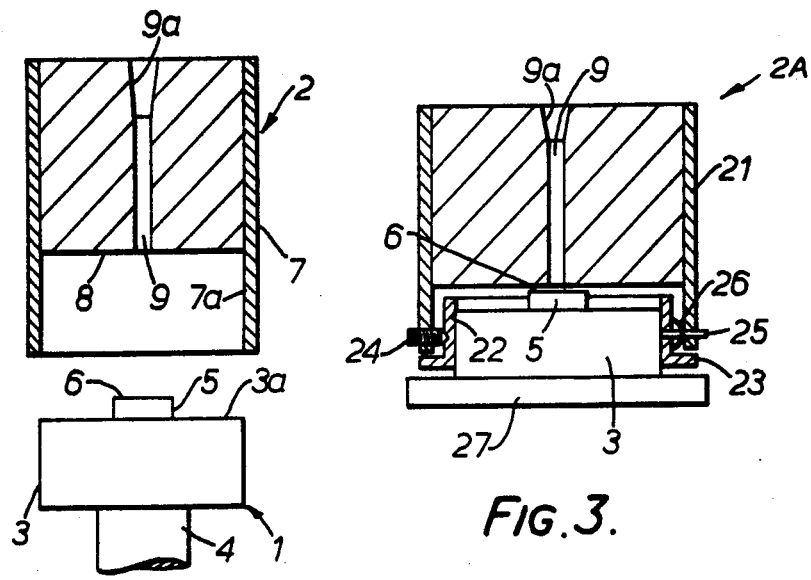
FIG. 1.
FIG. 3.
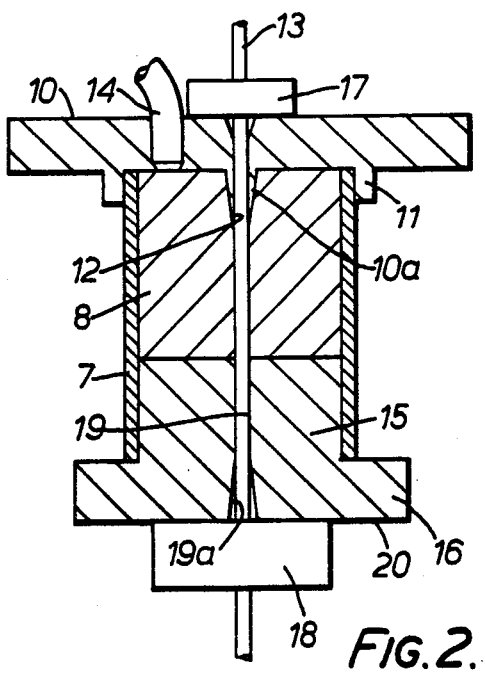
FIG. 2.

CONNECTORS FOR COAXIALLY COUPLING THE END OF A LINEAR OPTICAL WAVEGUIDE ELEMENT FOR A RECEIVING SURFACE

This invention relates to connectors for coupling the end of an optical fiber or other linear optical waveguide element to a small-area receiving surface, for example to the surface of a photodetector diode, in such a manner as to ensure that the fibre makes contact with the surface at right angles to and substantially centrally of the latter.

It is an object of the invention to provide an improved, relatively inexpensive connector for coupling the end of an optical waveguide element to a small-area light-receiving surface, which comprises two connector members by means of which effective coupling can be readily and reliably achieved even in relatively inaccessible locations.

According to the present invention there is provided a connector for coupling the end of an optical waveguide element to a light receiving surface mounted on a first connector member, in which the end of the optical waveguide element is supported in a second connector member, and in which one of the connector members includes a tubular part which slidingly receives at least part of the other connector member for accurately positioning the end of the waveguide on the receiving surface.

The receiving surface may be centrally arranged at the end of a cylindrical boss, with the end of the fibre or like element being supported in the second connector member and the latter comprising a body having an end portion in which the end of the waveguide element is centred, and of which at least the end portion which in the coupled position of the coupling members is nearest to the receiving surface, is enclosed in a cylindrical holder tube which extends beyond the end of the said end portion to form a collar which is adapted to encircle the boss and which provides a cylindrical bore for sliding co-operation with the cylindrical outer surface of the boss.

In order to ensure correct positioning of the end of the waveguide element in relation to the receiving surface, the said body is preferably provided with a longitudinal bore whose diameter only slightly exceeds that of the waveguide element so that the latter is a sliding fit therein, but which is flared at the outer end of the body to form a lead-in cone for the waveguide element. This bore is preferably formed while the body is cast in a mould which is partly constituted by the said holder tube, and through which a wire, of a material whose shrinkage is higher than that of the body, is extended along the axis of the holder tube under longitudinal tension, in a manner similar to the method of providing such bore described in our U.S. Pat. No. 3,944,328.

When the invention is intended for use in cases in which the receiving surface is very small and liable to be eccentric to the boss sufficiently to involve the risk of unsatisfactory coupling with a waveguide element whose end is concentric with the boss, the cylindrical bore for sliding co-operation with the boss is, according to one form of the invention, provided in a collar member which is so mounted within the collar portion of the holder tube as to be adjustable therein along one of its diameters thus making it possible, when the collar member is so placed on the boss that the said diameter extends in the direction of the eccentricity of the receiving surface to align the said surface with the end of the fibre or other waveguide element.

In order that the invention may be more readily understood, reference will now be made to the accompanying drawing, in which:

FIG. 1 is an elevation, partly in axial section, of one embodiment, with the fibre-end-supporting member aligned with, but axially separated from, a boss on which the receiving surface is provided;

FIG. 2 illustrates, somewhat diagrammatically, a jig for the manufacture of such fibre-supporting member, in section along the axis of that member; and FIG. 3 is an elevation, partly in axial section, of a second embodiment of the invention, which is shown coupled with a boss on which the receiving surface is provided.

Referring now first to FIG. 1, the connector member carrying the receiving surface is shown at 1, while 2 illustrates the connector member which supports the end of an optical fibre or other linear waveguide element. The surface-carrying member 1 comprises a boss-like cylindrical body or boss 3 which is carried at the end of a stem 4 to which one end face of the boss is attached, while a diode chip 5, constituting a photodetector diode is concentrically arranged on the opposite end face 3a of the boss 3, with its receiving surface 6 parallel to the end face 3a of the boss.

The other connector member 2 comprises a holder tube 7 which fits slidingly over the boss 3 of the surface-carrying member 1, and which encases a body 8, which is firmly secured therein, preferably by having been cast in position, and in which a narrow tubular through-bore or passage 9 of a diameter only slightly exceeding that of the optical fibre or the like, which is to be coupled to the receiving surface 6 is arranged coaxially with the tube 7 to provide accurate sliding guidance for such fibre in coaxial alignment with the tube 7. The body 8 has two parallel end faces at right angles to its axis, and the tube 7 is arranged to extend beyond one of these end faces, hereinafter called the coupling face or the front end of the body 8 to form a collar 7a adapted to be slid on to the boss 3 to permit substantial contact of the coupling face with the receiving surface when coupling is to be effected. At the opposite or rear end face of the body 8, the passage 9 ends with a flared lead-in portion 9a to facilitate the introduction of an optical fibre element. In order to couple such fibre element to the photodetector diode 5, the second connector member 2 is coupled to the first connector member 3 by first sliding the collar portion 7a of the holder tube 7 fully home on to the boss 3 of the member 1; then the optical fibre element is introduced into the passage 9 of the member 2 from the flared end of this passage, after some liquid whose index of refraction matches that of the optical fibre element, has been applied to the end of the fibre or to the receiving surface 6 or has been introduced into the passage 9. It will be readily appreciated that, provided the receiving surface 6 is arranged accurately at the centre of face 3a and at right angles to the axis of the boss 3, the use of the coupling member 2 will ensure accurate alignment of the end of the fibre with the receiving surface at accurately right angles to that surface. It will be obvious to those skilled in the art of fibre optics that the body 8, at least at the surface of the passage 9, should be of a material that will not be liable to transmit from the fibre to the body 8 any substantial part of the radiation conveyed by the optical fibre which is to be coupled to the surface 6.

FIG. 2 illustrates a casting jig that may be employed for the manufacture of the connector member 2 illustrated in FIG. 1. This device comprises a bracket plate 10 which is arranged to extend substantially horizontally, and which is provided at its lower side with a locating collar 11. The latter serves to locate the upper end of a length of tube which is intended to constitute the holding tube 7 of such connector member and has therefore been indicated by the reference number 7. Coaxially with this collar, the lower surface of the bracket plate 10 carries a projection 10a in the form of a truncated cone corresponding to the lead-in tapered portion 9a of the passage 9 in the body 8 of FIG. 1. Both the projection 10a and the bracket plate 10 itself are penetrated by a bore 12 for accurate sliding guidance of a metal wire 13 for a purpose to be explained further below, and a spout 14 is arranged in the plate 10 between the projection 10 and the inner diameter of the tube 7 to permit the injection of suitable moulding material for the formation of the body 8 of the connector member to be produced. The front face of the body 8 is determined by a plug member 15, which is introduced into the other end of the tube 7 with a sliding fit and has an end flange 16 for supporting that end of the tube 7. This plug member is also provided with a coaxial bore 19 whose diameter is equal to that of the bore 12, and which is preferably flared, as shown at 19a, at its end facing away from the body 8. The above-mentioned metal wire 13 is if necessary after the application of an anti-adhesive coating, threaded through both the aligned bores 12 and 16. Above the plate 10 it is held in a clamping block 17 which rests on the plate 10, while a clamping and tensioning member 18, supported against the outer end face 20 of the flanged plug member 15, applies a longitudinal pull to the wire 13. This ensures that the wire is straight and at the same time serves to hold the plug member 15 fully inserted into the tube 7 and, through the flange 16, to hold the tube 7 in contact with the plate 9. A suitable moulding material which will adhere firmly to the tube 7 but will, during its solification, shrink less than the wire 13, is now introduced through the spout 14 to fill the interior of the tube 7 between the plate 10 and the plug 15 and is then allowed to solidify. Then, after taking off the clamping-and-tensioning device 18, the tube 7 with the solidified body 8 and the plug member 15 can be pulled away from the bracket plate 10 and slipped off the wire 13. Finally the plug 15 is withdrawn out of the tube 7, thus completing the manufacture of a connector member 2 as shown in FIG. 1, and another similar connector member can then be similarly produced, employing another length of tube 7. While it is generally preferred to employ the body 8 itself to provide the wall surface of the passage 9, this wall surface may alternatively be provided by using a separate capillary tube, suitably flared to provide the lead-in taper 9a, and casting the body 8 round the capillary tube. In this case the bracket plate 10 may be made without a projecting cone portion such as that shown at 10a in FIG. 2. The capillary tube will be threaded on to the wire 13 above the plug 15, and a casting material is employed which will adhere firmly to the capillary tube as well as to the holding tube 7.

While the connector member 2 as hereinbefore described will be found highly satisfactory for use with receiving surfaces which are accurately centred on the end face of the boss 3, it is sometimes desirable to permit the use of a coupling member of similar kind even when the receiving surface happens to be arranged slightly out of centre so that the degree of coupling achieved when the optical fibre or other similar light-guide element is placed against the centre of the end face of the boss 3, is unsatisfactory.

A connector of modified form, which permits even in this case a satisfactory degree of coupling to be achieved is illustrated in FIG. 3. In this modified connector, a chip 5 presenting the receiving surface is, similarly as in the embodiment described with reference to FIG. 1, provided at the front face of a boss 3, but the body 8 of the second connector member 2A is cast in situ in a holding tube 21 — an operation which may be carried out in the manner hereinabove described with reference to FIG. 2 — This holding tube has an inside diameter which is larger than the diameter of the boss 3 by an amount sufficient to permit an auxiliary collar 22 to be accommodated with some radial play between the boss and the inner surface of the tube 21. This auxiliary collar 22 is a sliding fit in the boss 3 and is preferably provided with a flange 23 whose upper side (as shown in the drawing) faces the adjacent end of the holding tube 21 and is adjustable along a diameter of the latter by means of a set screw 24. The latter is arranged in a suitably screw-threaded bore of the tube 21 and has a pointed end which engages a centering recess in the outer surface of the auxiliary collar 22. A pin 25 radially projecting from a point of this collar that is diametrically opposite to this recess, is slidably supported in a cross-bore of the tube 21 which is aligned with the bore carrying the set screw 24, and a spring collar 26 or equivalent resilient member is interposed at the latter side between the collar 22 and the holding tube 21. Owing to this arrangement, adjustment of the set screw 24 will move the collar 22 in the direction of the diameter determined by the centering recess and the pin 25, and it will be readily appreciated that, provided the connector member 2A is placed on the boss 3 with the diameter containing the screw 24 and pin 25 extending in the direction of eccentricity of the receiving surface, it is possible, by turning the screw 24 in the appropriate direction, to align the passage 9, and thus the fibre element inserted into this passage, accurately with the receiving surface.

Various details of the connector and its use may be modified within the scope of the invention. Thus the boss 3, instead of being carried on a stem 4 as shown in FIG. 1, may be provided on a plate member as shown at 27 in FIG. 3, and while the index-matching liquid employed for improving the passage of optical wave energy from the optical fibre or the like to the receiving surface will in many cases be a liquid which will not change its character after its application, a liquid that will set after use may be used if the connection established is not required to be temporary.

What we claim is:

1. A connector for coupling the end of an optical waveguide element to a small-area light-receiving surface, which comprises a first connector member having a substantially rigid body and an end face on which the light-receiving surface is fixedly arranged, and a second connector member having a substantially rigid body formed with a coupling face at one end and with a cylindrical longitudinal through bore penetrating said coupling face at right angles to said face for closely surrounding the end of such waveguide element, said bore having a flared lead-in portion at its end remote from said coupling face, the body of the first connector member including a boss-like structure and the body of the second connector member including at its outer circumference a longitudinally projecting tubular part which presents an inner circumferential surface for slidingly receiving said boss-like body of said first connector member with such longitudinal penetration that said light-receiving surface is substantially in contact with said coupling face, said tubular part and said boss-like body being in such fixed relation to said cylindrical bore, and to said receiving surface respectively, as to each be parallel and substantially coaxial respectively with said bore and with an axis that extends through the centre of said light-receiving surface at right angles to the latter and in which the body of the second connector member has an end portion in which the end of the said waveguide element is centred and which, at least at that end which, in the coupled position of said first and second connector members, is nearest to the receiving surface, is enclosed in a cylindrical holder tube which extends beyond the end of the said end portion, to form a collar adapted to encircle the boss of the first connector member, and having a cylindrical bore for sliding cooperation with the cylindrical outer surface of the boss.

2. A connector for coupling the end of an optical waveguide element to a small-area light-receiving surface, which comprises a first connector member having a substantially rigid body and an end face on which the light-receiving surface is fixedly arranged, and a second connector member having a substantially rigid body formed with a coupling face at one end and with a cylindrical longitudinal through bore penetrating said coupling face at right angles to said face for closely surrounding the end of such waveguide element, said bore having a flared lead-in portion at its end remote from said coupling face, the body of one of the connector members including a boss-like structure and the body of the other connector member including at its outer circumference a longitudinally projecting tubular part which presents an inner circumferential surface for slidingly receiving said boss-like body of the said one connector member with such longitudinal penetration that said light-receiving surface is substantially in contact with said coupling face, said tubular part and said boss-like body being in such fixed relation, as to each be parallel and substantially coaxial respectively with said bore and with an axis that extends through the centre of said light-receiving surface at right angles to the latter.

3. A connector for coupling the end of an optical waveguide element to a small-area light-receiving surface, which comprises a first connector member having a substantially rigid body and an end face on which the light-receiving surface is fixedly arranged, and a second connector member having a substantially rigid body formed with a coupling face at one end and with a cylindrical longitudinal through bore penetrating said coupling face at right angles to said face for closely surrounding the end of such waveguide element, said bore having a flared lead-in portion at its end remote from said coupling face, the body of the first connector member including a boss-like structure and the body of the second connector member including at its outer circumference a longitudinally projecting tubular part, a collar defining a bore which presents an inner circumferential surface for slidingly receiving said boss-like body of said first connector member with said longitudinal penetration that said light-receiving surface is substantially in contact with said coupling face, said collar being supported within said tubular portion by means operable to effect parallel adjustment of the collar along a single diameter of the tubular projection thus making it possible if the light-receiving surface of the first connector member is offset from the axis of the boss-like body, to align the end of the waveguide element with the light-receiving surface by operating said adjustment means and so connecting the two connector members that the direction of said one diameter of the second connector member coincides with the direction in which the light-receiving surface of the first connector member is offset from the axis of the boss-like body, wherein said tubular portion and said boss-like body being in such fixed relation as to each be parallel and substantially coaxial respectively with said bore and with an axis that extends through the centre of said light-receiving surface at right angles to the latter.

4. A connector as claimed in claim 3, in which the adjustment means comprise a cylindrical guide pin projecting from the inner surface of the tubular portion along a radius of said portion and guidingly engaging a radial bore provided in the collar, a set screw having a pointed end and being mounted in a threaded bore provided in the tubular portion and arranged in coaxial alignment with said guide pin for co-operation of said pointed end with a centering recess provided in the outer circumferential surface of said collar so as to be in coaxial alignment with said radial bore, and a thrust-spring element placed round said guide pin between said tubular portion and the outer circumferential surface of said collar to urge the collar into engagement of its centering recess with the pointed end of said set screw.

* * * * *